(12) United States Patent
Levy

(10) Patent No.: US 7,978,874 B2
(45) Date of Patent: Jul. 12, 2011

(54) DIGITAL WATERMARKING FOR WORKFLOW BY TRACKING CONTENT OR CONTENT IDENTIFIERS WITH RESPECT TO TIME

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 1338 days.

(21) Appl. No.: 11/084,689

(22) Filed: Mar. 17, 2005

(65) Prior Publication Data

US 2005/0249374 A1 Nov. 10, 2005

Related U.S. Application Data

(63) Continuation-in-part of application No. 10/278,742, filed on Oct. 21, 2002, now Pat. No. 7,006,661.

(60) Provisional application No. 60/554,748, filed on Mar. 19, 2004.

(51) Int. Cl.
*G06K 9/00* (2006.01)
(52) U.S. Cl. ...................................................... 382/100
(58) Field of Classification Search .................. 382/100, 382/115–127, 232–253; 380/200–242; 358/426.01–426.16; 345/555; 348/384.1–440.1; 375/122, 240.01–240.29
See application file for complete search history.

(56) References Cited

U.S. PATENT DOCUMENTS

| | | | |
|---|---|---|---|
| 5,710,834 A | 1/1998 | Rhoads | |
| 5,822,436 A | 10/1998 | Rhoads | |
| 5,832,119 A | 11/1998 | Rhoads | |
| 5,841,886 A | 11/1998 | Rhoads | |
| 5,841,978 A | 11/1998 | Rhoads | |
| 5,862,260 A | 1/1999 | Rhoads | |
| 5,892,900 A * | 4/1999 | Ginter et al. ................... 726/26 |
| 6,122,403 A | 9/2000 | Rhoads | |
| 6,229,924 B1 | 5/2001 | Rhoads et al. | |
| 6,307,949 B1 | 10/2001 | Rhoads | |
| 6,311,214 B1 | 10/2001 | Rhoads | |
| 6,332,031 B1 | 12/2001 | Rhoads et al. | |
| 6,381,341 B1 | 4/2002 | Rhoads | |

(Continued)

FOREIGN PATENT DOCUMENTS

EP 1134977 9/2001
WO WO 02/37489 5/2002

OTHER PUBLICATIONS

Graser, "Paranoid Hollywood Wracked by Hack Attacks," Aug. 8, 2001, as reprinted by InfoSec News Aug. 9, 2001.

(Continued)

*Primary Examiner* — Samir A Ahmed
*Assistant Examiner* — Atiba O Fitzpatrick

(57) ABSTRACT

Digital watermarking provides a chain of custody for video in movie studios. Several novel improvements in workflow processes for digital watermarking provide chains of custody. In a first implementation, a digital watermark payload includes an embedder ID and time stamp. The embedder ID is associated with a controlling PC user log, including, e.g., the user log being linked to a biometric of the user. In a second implementation, a video player is forced to run a video digital watermark embedder based upon a rights command, where an ID embedded in a watermark payload is determined solely by the embedder. A third implementation encrypts a conglomerate of watermarked segments of video so that a rendering device can decrypt the segments in a manner to produce different results in each usage dependent upon the key. A fourth implementation embeds digital watermarks in DVD disk images during delivery to a duplication house.

20 Claims, 3 Drawing Sheets

U.S. PATENT DOCUMENTS

| | | |
|---|---|---|
| 6,385,329 B1 | 5/2002 | Sharma et al. |
| 6,408,082 B1 | 6/2002 | Rhoads et al. |
| 6,411,725 B1 | 6/2002 | Rhoads |
| 6,421,070 B1 | 7/2002 | Ramos et al. |
| 6,424,725 B1 | 7/2002 | Rhoads et al. |
| 6,427,020 B1 | 7/2002 | Rhoads |
| 6,456,726 B1 | 9/2002 | Yu et al. |
| 6,504,571 B1 | 1/2003 | Narayanaswami et al. |
| 6,505,160 B1 | 1/2003 | Levy et al. |
| 6,516,079 B1 | 2/2003 | Rhoads et al. |
| 6,522,769 B1 | 2/2003 | Rhoads et al. |
| 6,522,770 B1 | 2/2003 | Seder et al. |
| 6,535,617 B1 | 3/2003 | Hannigan et al. |
| 6,542,927 B2 | 4/2003 | Rhoads |
| 6,553,129 B1 | 4/2003 | Rhoads |
| 6,560,349 B1 | 5/2003 | Rhoads |
| 6,567,533 B1 | 5/2003 | Rhoads |
| 6,580,808 B2 | 6/2003 | Rhoads |
| 6,580,815 B1 * | 6/2003 | Grajewski et al. ............ 382/124 |
| 6,590,996 B1 | 7/2003 | Reed et al. |
| 6,611,607 B1 | 8/2003 | Davis et al. |
| 6,614,914 B1 | 9/2003 | Rhoads et al. |
| 6,636,615 B1 | 10/2003 | Rhoads et al. |
| 6,647,128 B1 | 11/2003 | Rhoads |
| 6,647,130 B2 | 11/2003 | Rhoads |
| 6,650,761 B1 | 11/2003 | Rodriguez et al. |
| 6,664,976 B2 | 12/2003 | Lofgren et al. |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,728,390 B2 | 4/2004 | Rhoads et al. |
| 6,744,906 B2 | 6/2004 | Rhoads et al. |
| 6,760,463 B2 | 7/2004 | Rhoads |
| 6,763,123 B2 | 7/2004 | Reed et al. |
| 6,768,809 B2 | 7/2004 | Rhoads et al. |
| 6,775,392 B1 | 8/2004 | Rhoads |
| 6,792,542 B1 | 9/2004 | Lee et al. |
| 6,798,894 B2 | 9/2004 | Rhoads |
| 6,813,366 B1 | 11/2004 | Rhoads |
| 6,879,701 B1 | 4/2005 | Rhoads |
| 6,917,724 B2 | 7/2005 | Seder et al. |
| 6,920,232 B2 | 7/2005 | Rhoads |
| 6,922,480 B2 | 7/2005 | Rhoads |
| 6,947,571 B1 | 9/2005 | Rhoads et al. |
| 6,950,532 B1 | 9/2005 | Schumann et al. |
| 6,975,746 B2 | 12/2005 | Davis et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Rhoads et al. |
| 7,051,086 B2 | 5/2006 | Rhoads et al. |
| 7,054,465 B2 | 5/2006 | Rhoads |
| 7,062,069 B2 | 6/2006 | Rhoads |
| 7,095,871 B2 | 8/2006 | Jones et al. |
| 7,099,492 B2 | 9/2006 | Rhoads |
| 7,111,170 B2 | 9/2006 | Rhoads et al. |
| 7,113,614 B2 | 9/2006 | Rhoads |
| 7,124,114 B1 | 10/2006 | Hollar |
| 7,139,408 B2 | 11/2006 | Rhoads et al. |
| 7,158,654 B2 | 1/2007 | Rhoads |
| 7,164,780 B2 | 1/2007 | Brundage et al. |
| 7,171,016 B1 | 1/2007 | Rhoads |
| 7,171,020 B2 | 1/2007 | Rhoads et al. |
| 7,174,031 B2 | 2/2007 | Rhoads et al. |
| 7,177,443 B2 | 2/2007 | Rhoads |
| 7,184,570 B2 | 2/2007 | Rhoads |
| 7,209,571 B2 | 4/2007 | Davis et al. |
| 7,213,757 B2 | 5/2007 | Jones et al. |
| 7,224,819 B2 | 5/2007 | Levy et al. |
| 7,248,717 B2 | 7/2007 | Rhoads |
| 7,254,249 B2 | 8/2007 | Rhoads et al. |
| 7,261,612 B1 | 8/2007 | Hannigan et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,369,678 B2 | 5/2008 | Rhoads |
| 7,377,421 B2 | 5/2008 | Rhoads |
| 7,391,880 B2 | 6/2008 | Reed et al. |
| 7,392,392 B2 | 6/2008 | Levy |
| 7,400,743 B2 | 7/2008 | Rhoads et al. |
| 7,406,214 B2 | 7/2008 | Rhoads et al. |
| 7,412,074 B2 | 9/2008 | Powell et al. |
| 7,424,131 B2 | 9/2008 | Alattar et al. |
| 7,424,132 B2 | 9/2008 | Rhoads |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,499,564 B2 | 3/2009 | Rhoads |
| 7,499,566 B2 | 3/2009 | Rhoads |
| 7,502,490 B2 | 3/2009 | Rhoads et al. |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,555,785 B2 | 6/2009 | Levy |
| 7,564,992 B2 | 7/2009 | Rhoads |
| RE40,919 E | 9/2009 | Rhoads |
| 7,587,601 B2 | 9/2009 | Levy et al. |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,689,532 B1 | 3/2010 | Levy |
| 7,693,300 B2 | 4/2010 | Reed et al. |
| 7,697,719 B2 | 4/2010 | Rhoads |
| 7,711,143 B2 | 5/2010 | Rhoads |
| 7,724,919 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 2001/0021144 A1 | 9/2001 | Oshima et al. |
| 2001/0034705 A1 | 10/2001 | Rhoads et al. |
| 2001/0037313 A1 | 11/2001 | Lofgren et al. |
| 2001/0054144 A1 | 12/2001 | Epstein et al. |
| 2001/0055407 A1 | 12/2001 | Rhoads |
| 2002/0009208 A1 | 1/2002 | Alattar et al. |
| 2002/0032502 A1 | 3/2002 | Russell |
| 2002/0061120 A1 | 5/2002 | Carr et al. |
| 2002/0064759 A1 | 5/2002 | Durbin et al. |
| 2002/0090114 A1 | 7/2002 | Rhoads et al. |
| 2002/0124024 A1 * | 9/2002 | Patterson et al. ............. 707/517 |
| 2002/0131076 A1 | 9/2002 | Davis |
| 2002/0138744 A1 | 9/2002 | Schleicher et al. |
| 2002/0168082 A1 | 11/2002 | Razdan |
| 2002/0169721 A1 * | 11/2002 | Cooley et al. ................... 705/51 |
| 2002/0176003 A1 | 11/2002 | Seder et al. |
| 2002/0186886 A1 | 12/2002 | Rhoads |

| | | |
|---|---|---|
| 2002/0188841 A1 | 12/2002 | Jones et al. |
| 2002/0196272 A1 | 12/2002 | Ramos et al. |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2003/0138127 A1 | 7/2003 | Miller et al. |
| 2004/0005093 A1 | 1/2004 | Rhoads |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0129627 A1 | 5/2009 | Levy et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0054529 A1 | 3/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2010/0296526 A1 | 11/2010 | Rhoads |
| 2011/0007936 A1 | 1/2011 | Rhoads |

OTHER PUBLICATIONS

U.S. Appl. No. 60/554,748, filed Mar. 19, 2004.
U.S. Appl. No. 08/635,531, filed Apr. 25, 1996, Geoffrey B. Rhoads.
U.S. Appl. No. 09/413,117, filed Oct. 6, 1999, Geoffrey B. Rhoads.
U.S. Appl. No. 09/507,096, filed Feb. 17, 2000, Geoffrey B. Rhoads et al.
U.S. Appl. No. 12/912,461, filed Oct. 26, 2010, Adnan M. Alattar.
U.S. Appl. No. 09/482,749, filed Jan. 13, 2000, Geofrey B. Rhoads.
U.S. Appl. No. 09/234,780, filed Jan. 20, 1999, Geoffrey B. Rhoads.
U.S. Appl. No. 09/343,104, filed Jun. 29, 1999, Tony F. Rodriguez et al.
U.S. Appl. No. 09/697,009, filed Oct. 25, 2000, Bruce L. Davis et al.
U.S. Appl. No. 09/967,015, filed Oct. 25, 2000, Bruce L. Davis.
U.S. Appl. No. 09/633,587, filed Aug. 7, 2000, Geoffrey B. Rhoads et al.
U.S. Appl. No. 09/567,405, filed May 8, 2000, Geoffrey B. Rhoads et al.
U.S. Appl. No. 09/689,289, filed Oct. 11, 2000, Geoffrey B. Rhoads et al.
U.S. Appl. No. 09/629,649, filed Aug. 1, 2000, J. Scott Carr et al.
U.S. Appl. No. 09/552,998, filed Apr. 19, 2000, Tony F. Rodriguez et al.
U.S. Appl. No. 09/343,101, filed Jun. 29, 1999, Bruce L. Davis et al.
U.S. Appl. No. 12/953,190, filed Nov. 23, 2010, Geoffrey B. Rhoads.
U.S. Appl. No. 09/538,493, filed Mar. 30, 2000, Geoffrey B. Rhoads.

* cited by examiner

US 7,978,874 B2

DIGITAL WATERMARKING FOR WORKFLOW BY TRACKING CONTENT OR CONTENT IDENTIFIERS WITH RESPECT TO TIME

RELATED APPLICATION DATA

This application is a continuation-in-part of U.S. patent application Ser. No. 10/278,742 (published as U.S. 2003-0138127 A1), filed Oct. 21, 2002. This patent application also claims the benefit of U.S. Provisional Patent Application No. 60/554,748, filed Mar. 19, 2004. This application is also related to U.S. patent application Ser. No. 09/858,336 (published as U.S. 2002-0124024 A1), filed May 15, 2001. Each of these patent documents is herein incorporated by reference.

TECHNICAL FIELD

The present invention relates generally to digital watermarking. In a specific example, the present invention embeds digital watermarks in media content to provide a chain of custody.

BACKGROUND AND SUMMARY

Movie studios have a problem in that they have not established a successful mechanism to provide a chain of custody for their video or other media. In other words, their video is not linked to a current person, usually an employee, whom is in possession of the video. This problem is described even more fully in a paper by Simon Byers, et al. titled "Analysis of Security Vulnerabilities in the Movie Production and Distribution Process," Sep. 13, 2003, (http://lorrie.cranor.org/pubs/drm03-tr.pdf), incorporated herein by reference.

Digital watermarks can be used to link video to a specific person. I disclose herein several processes to make this linking efficient in terms of a conventional video workflow.

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914, which are hereby incorporated by reference.

One aspect of the invention provides workflow efficiency by matching a time based log of personal computer (PC) users with a watermark embedder ID (e.g., a number or plural-bit identifier) and date/time stamp. The embedder ID is uniquely associated with the PC, so that a user can be matched to a computer via the embedder ID and a log of user activity on the PC. This system works automatically, without an operator needing to keep track of IDs and video that is processed on the system.

Another aspect of the invention is a system responsive to a rights command. The rights command requires a video player to embed a forensic ID in content, where a watermark embedder—and not the rights command—controls which data is embedded. More specifically, a rights language, such as MPEG-21 REL (ISO/EEC 21000-5 draft, incorporated herein by reference) is used to mandate watermark embedding, but is not used to specify a particular identifier or data to be embedded.

Still another aspect is an encrypted video file with certain video segments duplicated therein. The duplicated segments can be encrypted according to different keys. The segments are used to generate different unique watermarks when the content is rendered by applying device specific decryption keys. Consider a typical movie trail. A movie is passed from one executive to another, perhaps even to editors and directors, each giving their approval prior to release of the movie. The video is played on a rendering device (e.g., video player). To establish an audit trail the player preferably generates a unique ID that is associated with the player or executive in the video, based upon selective decryption of the duplicated video segments as dictated by device-specific keys. An embedded identifier is then dependent upon which player is rendering the video (e.g., which movie studio executive is currently viewing the video as the video is passed along to each other after approval of a master version for release). The embedding happens during viewing (a.k.a. rendering) in the player.

(Related information for embedding is found, e.g., in EP 1134977 entitled "Method and system for providing copies of scrambled content with unique watermarks, and system for descrambling scrambled content" (incorporated herein by reference) and J. Benaloh, et al's, "Efficient Fingerprinting to Protect Digital Content," a copy of which is found at http://research.microsoft.com/crypto/FingerMark.ppt, which is incorporated herein by reference.)

Yet another aspect of the present invention is identifying an intended recipient of a DVD disk by embedding a recipient identifier in a DVD disk master file during transport of the disk to the recipient.

The foregoing and other features, aspects and advantages of the present invention will be more readily apparent from the following detailed description, which proceeds with reference to the accompanying drawings.

DETAILED DESCRIPTION

Workflow Overview

Figure 1:
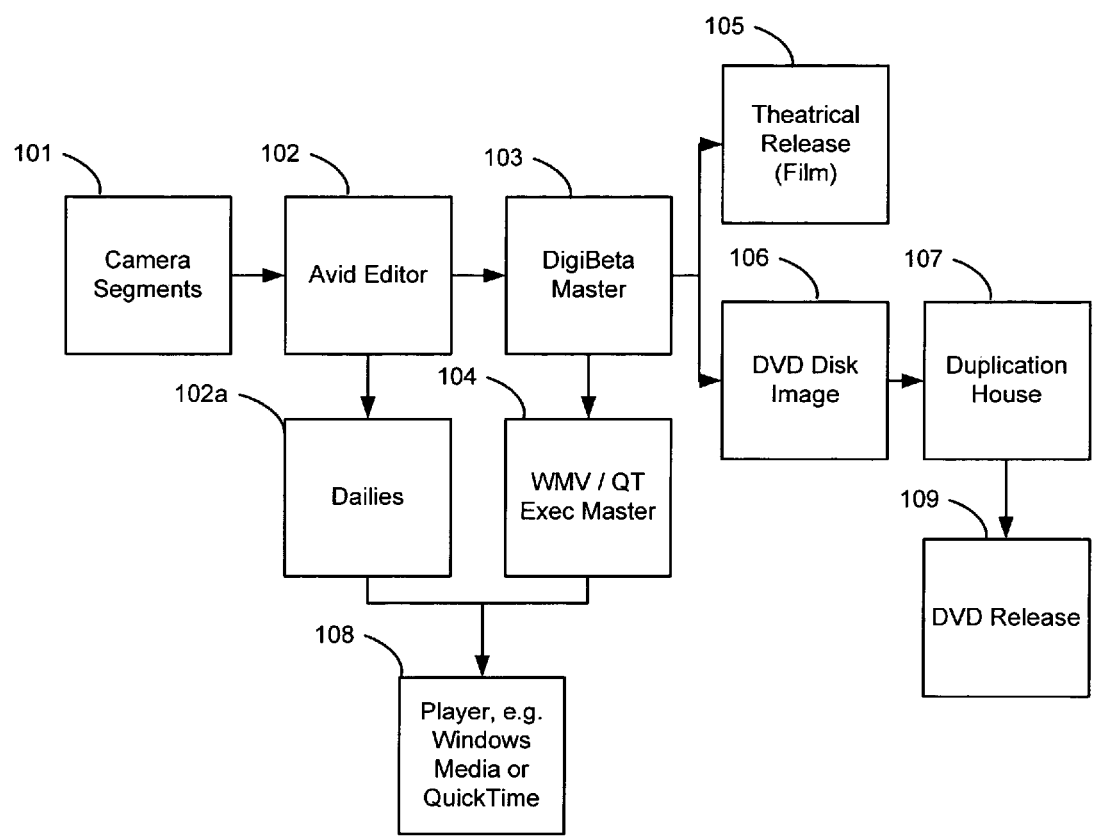
FIG. 1 is flowchart illustrating a conventional workflow during video creation.

FIG. 1 illustrates a workflow during video creation. Camera segments (e.g., images or frames) are recorded to film in step 101. The segments are edited by using, e.g., software editing tools (e.g., Avid editing tools for Macs and Windows PCs) in step 102. A finished version is written to a digital master file (e.g., stored on DigiBeta) via a channel (e.g., SDI) in step 103. The master may include a final version (or semi-final like a rough cut version) to which sound and effects have been added. (Of course, other editing software, such as is provided by Apple and Adobe, and other master storage formats can be suitably interchanged with these aspects of the invention.). Steps 101-103 are typically repeated as additional camera segments are captured. And, of course, these steps can be substituted or augmented with digital video as well.

In the process of shooting film on a day-to-day basis, reviews are often performed on previous work. These reviews are provided in video segments and are referred to as "dailies." (Dailies are rough cuts or segments that may or may not include sound tracks or effects. Dailies can be viewed by directors and crew to determine what else needs to be accomplished for a completion of a particular scene or to track a movie timeline.). Thus, these dailies are produced for review or approval in step 102a. The daily segments can be provided via Windows Media Video (WMV) and/or QuickTime (QT), although they may be recorded to, e.g., DigiBeta and converted later.

A Master can be copied to a WMV/QT file for executive review, where executives (or directors, editors, assistants, advertisers, promoters, etc., herein collectively referred to as "executives") may pass the same file along to other executives to gain approval or exposure as shown in step 104. The executives will play this content in a player 108, such as Windows Media Player, QuickTime player, or other suitable player. In step 105 and 106, after approval by required movie executives, the DigitBeta Master is converted to film for theatrical release and to a DVD disk image file (e.g., MPEG2 disk image file), respectively. (As will be appreciated, the disk image file is the file that is used to direct the burning of DVDs.). In step 107 and 108, the disk image is distributed, e.g., using a content distribution service like WamNet, to a duplication house for DVD disk creation and release.

In addition, a DigiBeta Master or editor version may be converted to MPEG-2 (8-10 Mbps) and this file is converted to WMV and/or QuickTime using, e.g., Telestream Flip Factory™.

Instead of film as in step 105, a final movie may be digitally stored as a master copy for transmission in digital cinema applications.

Automatic Logging

The first improvement in such a workflow involves automatic logging, and can occur, e.g., at step 102a and/or 104 in FIG. 1.

Figure 2:
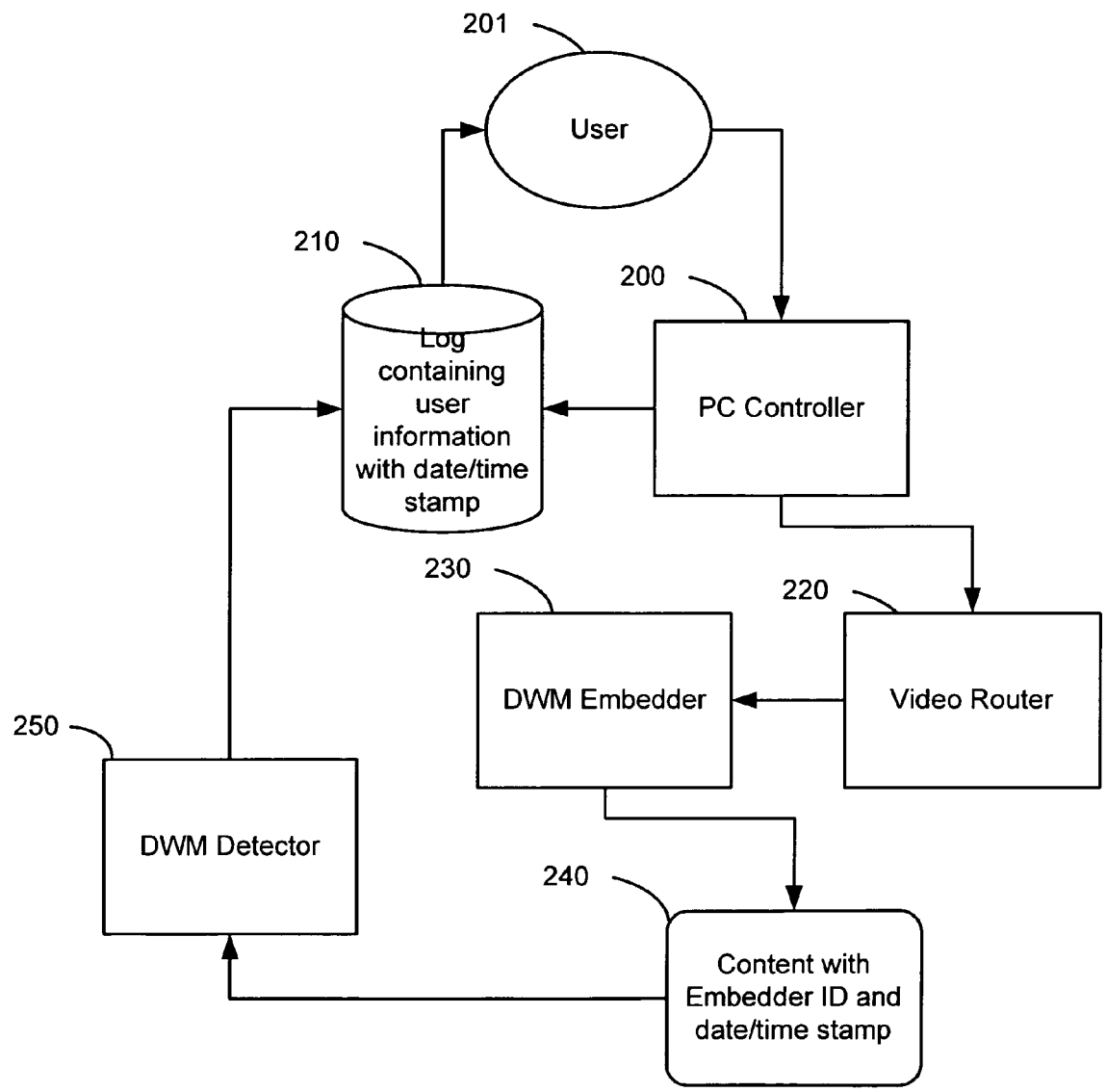
FIG. 2 is illustrates an architecture for automatic logging.

One preferred logging system is illustrated in FIG. 2. A personal computer (PC) or video editing terminal includes a PC controller 200 (e.g., software executing on the personal computer or video editing terminal). PC controller 200 control a video router 220 as video copies are made or transmitted. A watermark embedder 230 embeds an embedder ID via digital watermarking and, preferably, embeds a time stamp into video (or audio) copies 240. The embedded ID may include, e.g., a number, text, code or plural-bit identifier that is preferably uniquely associated with the watermark embedder, PC, PC controller 200 and/or a database or data record. Ideally, the time stamp includes or indexes enough data to resolve the time, month, day and year. Many methods can be used, such as including minutes from a fixed date (e.g., how many minutes from Jan. 1, 2004). This example requires 27 bits for a 50 year range. The watermarking is preferably automatically (and unavoidably) activated as copies are generated or routed by video router. (In fact, the watermark embedder can be viewed as a continuous process, which embeds all content from a video router.) Usually, the video communications channel is a Serial Digital Interface (SDI), but other channels can be suitably interchanged herewith.

The PC controller 200 helps manage or track user activity. For example, an active user 201 logs on to the PC. The PC controller 200 communicates which user accesses the PC to a database or record 210. Thus, the data record includes a record of which users accessed the PC.

When content 240 is found (especially if in an illegitimate or unexpected location), the watermark is read with digital watermark (DWM) detector 250. The embedder ID and timestamp are obtained from the watermark by detector 250. The embedder ID is used to locate a corresponding record in database or log 210. (Alternatively, the embedder ID identifies a particular PC, which includes the data record itself.). The corresponding record indicates that the embedder ID is associated with the PC or PC controller 200. A particular user is determined from the timestamp (e.g., a user is identified as using the PC during a time represented by the watermark date/time stamp). The log 210 may also include times representing when a user logged-on and log off of the PC, or which current users were logged on at time intervals, like every 15 minutes. Thus, the timestamp and recorded user access can be used to determine who is responsible for copying or transmitting the video in which the embedder ID was found.

User identity can be authenticated to avoid spoofing the PC with a username and password. For example, the PC may use biometrics, such as a fingerprint, eye scan or face recognition; thus, further increasing authentication of the user. A digital image of the user's face or eye (e.g., iris or retina scan) can be saved in the log 210 to verify the user. Secure IDs can be used, such that the PC is secured by what you know (e.g., secure ID), what you are (e.g., employee level 10, which may or may not be authorized to copy video), and what you have (e.g., perhaps a user is required to present a feature for biometric sampling, or even present a watermarked object for verification as discussed, e.g., in assignee's U.S. patent application Ser. No. 09/790,322, published as U.S. 2001-0037313 A1).

In an alternative implementation, the controller PC 200 itself includes one or more computers and includes or cooperates with one or more digital watermark embedders.

As an additional alternative, PC controller 200 does not "control" the video router. Instead, the PC controller 200 monitors and records user access on the PC. A watermark embedder automatically embeds the Embedder ID in any content routed by the router as discussed above.

As mentioned above, an embedder ID is preferably uniquely associated with a PC, PC controller or particular data record. Thus, the embedder ID can always be traced to the PC or PC controller via the data repository 210. In a multiple computer—but only one watermark embedder— scenario, unique association between a PC controller and embedder ID is preserved by connecting the watermark embedder 230 to the PC controllers and changing the embedder ID based upon which PC controller is active. (Of course, this interconnection is avoided by providing a separate watermark embedder for each PC controller, and ensuring the watermark embedder is embedding a video stream controlled by the PC controller.).

Automatic Embedding Based Upon Rights Command

Figure 3:
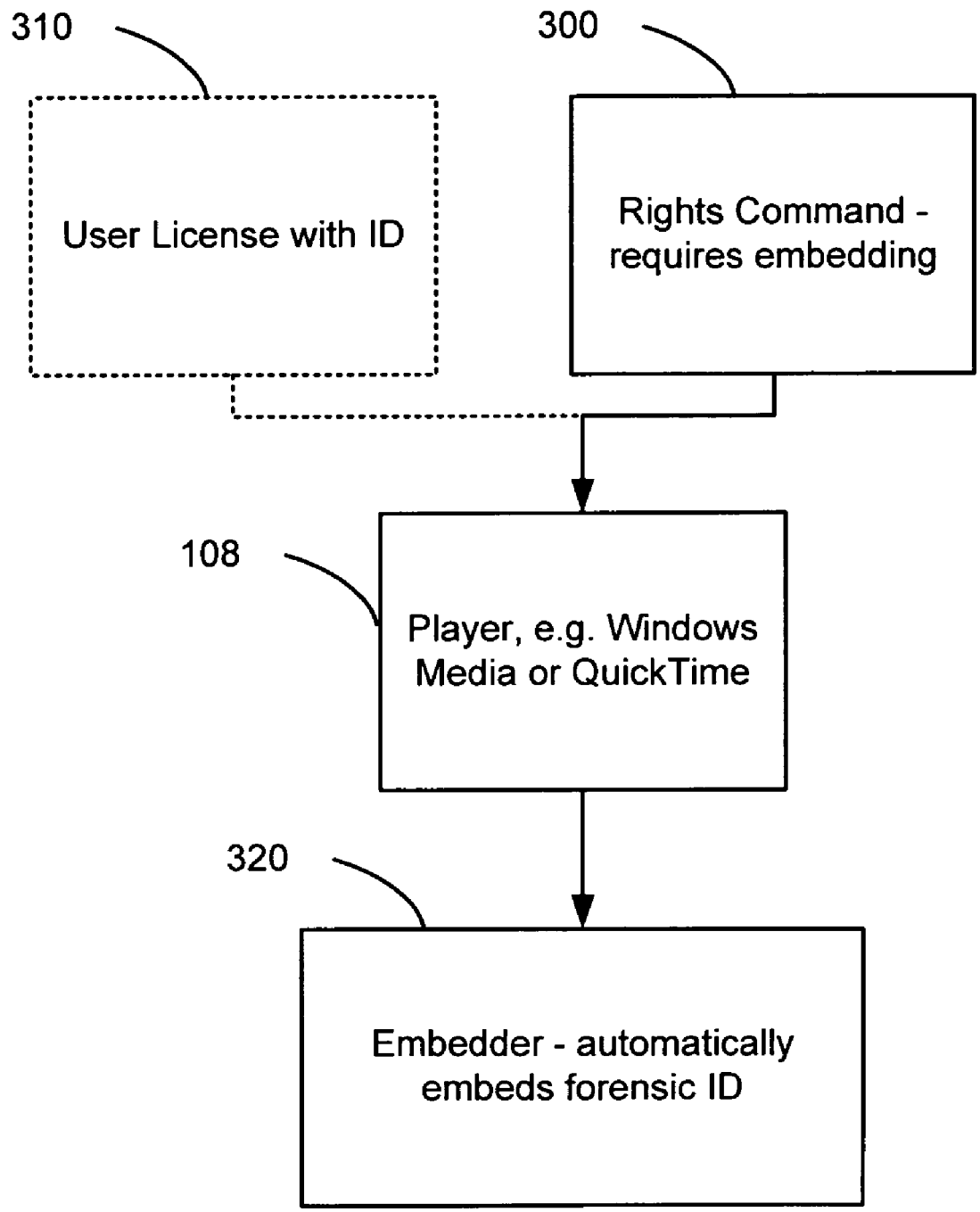
FIG. 3 is a flowchart illustrating a rights command controlled embedding.

A second improvement to the FIG. 1 work flow provides automatic watermark embedding during video rendering, as shown in FIG. 3. The term "render" includes its familiar meaning of playing, providing, displaying or performing, etc. Specifically, a rights command 300, which states that watermark embedding is required, is used to force a video player 108 to embed data with embedder 320.

A novel twist is that embedder 320, and not rights command 300, controls what is embedded in content. The rights command 300 may be part of a rights language, such as MPEG-21 REL, mentioned above. The embedder 320 may be a software plug-in that must be installed on a computer to play the video, such as a DirectX Media Object (DMO), as used with Windows Media Player. The embedder embeds a unique forensic ID related to the user, user's computer, video player or user's license 310. The embedding occurs during (or just prior to) rendering of the video. User license 310 is optional (as shown by the dotted box) as the other forensic ID options could be used.

The forensic ID is used for tracking purposes.

Thus, a database is preferably maintained to link unique forensic IDs to users or players. (The association can be through predetermined identifiers or through physical addresses or computer serial numbers, etc.). This database is preferably protected for privacy.

With reference to FIGS. 1 and 3, content is optimally encrypted. Player 108 then must search for rights commands 300 for decryption permissions (or instructions) and preferably enables embedder 320 prior to decrypting the content for rendering. A trusted player 108 could work with non-encrypted content, as it is "trusted" (or programmed) to look for rights commands 300 and enable embedder 320. In either case, the player 108 preferably does not play content if the embedder 320 is not available or working.

If illegitimate video is found, the forensic ID is read from the watermark with a watermark detector. If the detector cannot read the watermark in the illegitimate video sample, the original can be used to separate the DWM from the video. (For example, the illegitimate sample and/or the original is converted to similar formats, aspect ratio, size, etc., and then the difference between the sample and original which will typically yield at least some of the watermark signal.).

Automatic Embedding Using Encrypted and DWM Segments

A third improvement to the FIG. 1 workflow is related to the second improvement, above, but uses a different player side approach.

Protection is provided in player 108. An encrypted file with certain segments duplicated with different watermark payloads is used. When the encrypted file is rendered, the rendered content contains a digital watermark with a forensic ID in its payload, which may include the active user ID, the player ID, or user's license ID. The digital watermark payload is created from decrypting different watermarked segments. The player is usually located, e.g., on a PC of a movie studio executive. The executive passes video along to another executive after she approves the version.

In other words, this approach identifies the rendering device in a peer-to-peer (P2P) environment, where the P2P environment consists of movie executive's PC and email or ftp.

A forensic ID, e.g. player or user license ID, cooperates with a database that records a corresponding executive's ID or rendering device ID. This database is preferably protected for privacy.

DWM in DVD Disk Image During Transit

A fourth improvement embeds one or more digital watermarks in a DVD disk image during transport of the disk image to a duplication house in block 107 (FIG. 1). At least one watermark includes a payload that identifies the duplication house, e.g. a duplication ID. This system includes an embedder sitting on a server (or router) that is in the path of video distribution. The server may embed the video before distributing it based upon the request of the duplication house 107. The embedder may alternatively reside at the duplication house 107 receiving server and embed video with a duplication ID upon receipt, or reside in a predictable location between the studio and distribution house 107.

If content is found in an unauthorized or unexpected location, such as on a public P2P network, a watermark detector can read the forensic ID, e.g. duplication ID, and link it to the duplication house 107. (The duplication ID can be used to query a data record to identify a corresponding duplication house 107. Protecting this data record for privacy is not a large issue since consumers are not involved, and the watermark detector is usually held by the content owner in secrecy.)

Some combinations of the above disclosure are provided below. Of course, these are not the only combinations that are possible for the above disclosure, and are provided by way of example only. Other combinations are provided in the claims and still further combinations can be achieved based on the above disclosure.

A. An apparatus comprising:
a media player; and
a digital watermark embedder,
wherein said media player searches content or data associated with the content for a rights command, wherein the right command requires said digital watermark embedder to embed an identifier into content rendered by said media player and, absent such embedding, the media player will not render the content, and
wherein the identifier is generated by said digital watermark embedder.

A1. The apparatus of A wherein the identifier is related to a user license.

A2. The apparatus of A wherein the identifier comprises a media player identifier.

A3. The apparatus of A wherein the identifier is related to a user via a restricted database.

A4. The apparatus of A wherein said content comprises video.

A5. The apparatus of A3 wherein the identifier is related to a user license.

A6. The apparatus of A3 wherein the identifier comprises a player identifier.

A7. The apparatus of A3 wherein the identifier is determined solely by the watermark embedder.

B. A method comprising:
tracking which users access a computer system according to time;
communicating the users and related times for storage in a data record;
causing, without user input, unmarked video to be steganographically marked upon a copy or transmission of the video, wherein the steganographic marking embeds an identifier that is uniquely associated with the computer system or data record.

B1. The method of B wherein upon receipt of a timestamp, said method further comprises indexing the data record with at least a portion of the time stamp to identify a user.

C. A method to forensically identify content leaked from a video workflow comprising:
upon rendering of content by a movie executive, steganographically embedding a device specific identifier in the content, wherein the device specific identifier is determined based on decryption keys to decrypt duplicate encrypted segments in the content; and
rendering the content.

Concluding Remarks

Having described and illustrated the principles of the technology with reference to specific implementations, it will be recognized that the technology can be implemented in many other, different, forms.

To provide a comprehensive disclosure without unduly lengthening the specification, applicants incorporate by reference the U.S. patent documents referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

While FIG. 1 illustrates a particular conventional workflow, my inventive techniques can be applied to other chain of custody and forensic tracking workflows as well.

The particular combinations of elements and features in the above-detailed embodiments are exemplary only; the interchanging and substitution of these teachings with other teachings in this and the incorporated-by-reference patents/applications are also contemplated.

What is claimed is:

1. An apparatus, comprising:
    a controller;
    router; and
    at least one multi-purpose electronic processor configured as a digital watermark embedder,
        wherein the controller is configured to provide user information to a data record;
        wherein the data record is configured to maintain a time-based user log to track user access to the apparatus relative to time, and
        wherein the at least one multi-purpose electronic processor is configured to automatically embed an identifier and time stamp into content provided from the router, wherein the identifier is uniquely associated with the apparatus or controller and the data record such that the content is traceable via the identifier and time stamp to a user of the apparatus via reference to the data record at a particular time.

2. The apparatus of claim 1, wherein the content comprises video and the router comprises a video router.

3. The apparatus of claim 1, wherein the controller requires the user to present a biometric prior to allowing access to the apparatus.

4. The apparatus of claim 1, wherein the controller is configured to control the at least one multi-purpose electronic processor to change the identifier.

5. A method of embedding digital watermarks in content, the method comprising:
    updating a data record to reflect user access to an electronic computerized system with respect to time;
    automatically embedding, with at least one configured multi-purpose electronic processor, a digital watermark including an identifier in a copy of content, wherein the identifier is uniquely associated with the data record, and wherein the digital watermark further comprises a timestamp;
    wherein upon receipt of the identifier by a decoder, the decoder is configured to:
        identify the data record based on the identifier, and
        identify a user associated with the data record based on a time associated with the timestamp.

6. The method of claim 5, wherein the content omprises video content, and the router comprises a video router.

7. The method of claim 5, further comprising requiring a biometric prior to allowing user access to the electronic computerized system.

8. The method of claim 5, wherein the user access comprises user activity across a plurality of electronic computerized systems, wherein the identifier is changed to reflect which of the electronic computerized systems is active.

9. A method for forensically tracking content, the method comprising:
    receiving a watermark identifier embedded in a digital watermark; identifying, with at least one configured multi-purpose electronic processor, a data record from amongst a plurality of data records based on the watermark identifier;
    receiving a timestamp; and
    identifying, with the least one configured multi-purpose electronic processor, a user associated with the data record based on the timestamp.

10. The method of claim 9, wherein the digital watermark is associated with video content.

11. The method of claim 9, wherein the watermark identifier comprises at least one of a number and a plural-bit identifier.

12. An apparatus comprising:
    at least one configured multi-purpose electronic processor configured to:
        receive a watermark identifier embedded in a digital watermark;
        identify a data record from amongst a plurality of data records based on the watermark identifier;
        receive a timestamp; and
        identify a user associated with the data record based on the timestamp.

13. The apparatus of claim 12, wherein the digital watermark is associated with video content.

14. The apparatus of claim 12, wherein the watermark identifier comprises at least one of a number and a plural-bit identifier.

15. A non-transitory computer-readable medium having instructions stored thereon that, if executed by a computing device, cause the computing device to perform operations comprising:
    receiving a watermark identifier embedded in a digital watermark;
    identifying a data record from amongst a plurality of data records based on the watermark identifier;
    receiving a timestamp; and
    identifying a system user associated with the data record based on the timestamp.

16. The computer-readable medium of claim 15, wherein the digital watermark is associated with video content.

17. The computer-readable medium of claim 15, wherein the watermark identifier comprises at least one of a number and a plural-bit identifier.

18. A non-transitory computer-readable medium having instructions stored thereon that, if executed by a computing device, cause the computing device to perform operations comprising:
    updating a data record to reflect user access to an electronic computerized system with respect to time;
    automatically embedding a digital watermark including an identifier in a copy of content, wherein the identifier is uniquely associated with the data record, and wherein the digital watermark further comprises a timestamp;
    wherein upon receipt of the identifier by a decoder, the decoder is configured to:
        identify the data record based on the identifier, and
        identify a user associated with the data record based on a time associated with the timestamp.

19. The computer-readable medium of claim 18, wherein the content comprises video content, and the router comprises a video router.

20. The computer-readable medium of claim 18, wherein the operations further comprise requiring a biometric prior to allowing user access to the computing device.

* * * * *

UNITED STATES PATENT AND TRADEMARK OFFICE
CERTIFICATE OF CORRECTION

PATENT NO. : 7,978,874 B2  
APPLICATION NO. : 11/084689  
DATED : July 12, 2011  
INVENTOR(S) : Levy Page 1 of 2

It is certified that error appears in the above-identified patent and that said Letters Patent is hereby corrected as shown below:

Title page, item (56), under "U.S. Patent Documents", in Column 1, Line 1, Above "5,710,834 A 1/1998 Rhoads" insert

| | | |
|---|---|---|
| -- 4,025,851 | 5/1977 | Haselwood et al. |
| 4,677,466 | 6/1987 | Lert, Jr. et al. |
| 4,697,209 | 9/1987 | Kiewit et al. |
| 4,718,106 | 1/1988 | Weinblatt |
| 4,739,398 | 4/1988 | Thomas et al. |
| 4,807,031 | 2/1989 | Broughton et al. |
| 4,858,000 | 8/1989 | Lu |
| 4,901,004 | 2/1990 | King |
| 4,945,412 | 7/1990 | Kramer |
| 4,969,041 | 11/1990 | O'Grady et al. |
| 5,136,647 | 9/1992 | Haber et al. |
| 5,319,735 | 6/1994 | Preuss et al. |
| 5,436,653 | 7/1995 | Ellis et al. |
| 5,450,490 | 9/1995 | Jensen et al. |
| 5,481,294 | 1/1996 | Thomas et al. |
| 5,574,962 | 11/1996 | Fardeau et al. |
| 5,579,124 | 11/1996 | Aijala et al. |
| 5,581,800 | 12/1996 | Fardeau et al. |
| 5,636,292 | 6/1997 | Rhoads |
| 5,646,997 | 7/1997 | Barton --. |

Title page, item (56), under "U.S. Patent Documents", in Column 1, Line 2, above "5,822,436 A 10/1998 Rhoads" insert

| | | |
|---|---|---|
| -- 5,721,788 | 2/1998 | Powell et al. |
| 5,765,152 | 6/1998 | Erickson |

Signed and Sealed this  
Tenth Day of January, 2012

David J. Kappos  
*Director of the United States Patent and Trademark Office*

| | | |
|---|---|---|
| 5,768,426 | 6/1998 | Rhoads |
| 5,809,317 | 9/1998 | Kogan, et al. --. |

Title page, item (56), under "U.S. Patent Documents", in Column 2, Line 5, above "6,122,403 A 9/2000 Rhoads" insert

| | | |
|---|---|---|
| -- 5,910,987 | 6/1999 | Ginter, et al. |
| 5,943,422 | 8/1999 | Van Wie, et al. --. |

Title page, item (56), under "U.S. Patent Documents", in Column 2, Line 6, above "6,229,924 B1 5/2001 Rhoads et al." insert -- 6,209,092 3/2001 Linnartz --.

Title page, item (56), under "U.S. Patent Documents", in Column 2, Line 7, above "6,307,949 B1 10/2001 Rhoads" insert

| | | |
|---|---|---|
| -- 6,240,185 | 5/2001 | Van Wie, et al. |
| 6,243,480 | 6/2001 | Zhao, et al. |
| 6,282,654 | 8/2001 | Ikeda, et al. --. |

Title page, item (56), under "U.S. Patent Documents", in Column 2, Line 9, above "6,332,031 B1 12/2001 Rhoads et al." insert -- 6,324,573 11/2001 Rhoads --.

Page 2, item (56), under "U.S. Patent Documents", in Column 1, Line 3, above "6,411,725 B1 6/2002 Rhoads" insert -- 6,408,331 6/2002 Rhoads --.

Page 3, item (56), under "Other Publications", in Column 2, Line 7, delete "Geofrey" and insert -- Geoffrey --.

Column 7, Line 22, in Claim 1, delete "router;" and insert -- a router; --.

Column 7, Line 59, in Claim 6, delete "omprises" and insert -- comprises --.

Column 8, Line 9, in Claim 9, delete "least" and insert -- at least --.